(12) United States Patent
Stokes

(10) Patent No.: US 9,694,919 B2
(45) Date of Patent: *Jul. 4, 2017

(54) APPARATUS FOR SPACECRAFT

(71) Applicant: PHS Space Limited, Potters Bar (GB)

(72) Inventor: Peter Hedley Stokes, Pitlochry (GB)

(73) Assignee: PHS Space Limited, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,723

(22) Filed: Jan. 28, 2016

(65) Prior Publication Data

US 2016/0152355 A1 Jun. 2, 2016

Related U.S. Application Data

(63) Continuation of application No. 13/514,175, filed as application No. PCT/GB2010/052037 on Dec. 7, 2010, now Pat. No. 9,278,765.

(30) Foreign Application Priority Data

Dec. 7, 2009 (GB) .................................. 0921427.1

(51) Int. Cl.
| | |
|---|---|
| B64G 1/56 | (2006.01) |
| B64G 1/10 | (2006.01) |
| B64G 1/22 | (2006.01) |
| B64G 1/24 | (2006.01) |
| B64G 1/52 | (2006.01) |

(52) U.S. Cl.
CPC ............. B64G 1/56 (2013.01); B64G 1/1078 (2013.01); B64G 1/222 (2013.01); B64G 1/242 (2013.01); B64G 1/52 (2013.01)

(58) Field of Classification Search
CPC .................................. B64G 1/58; B64G 1/56
USPC ............................................ 244/171.6, 171.7
See application file for complete search history.

(56) References Cited

U.S. PATENT DOCUMENTS

| | | | |
|---|---|---|---|
| 3,004,735 A * | 10/1961 | Kinard | B64G 1/52 102/340 |
| 3,752,996 A | 8/1973 | Meissinger | |
| 3,872,911 A * | 3/1975 | Janes | B64G 1/50 160/1 |

(Continued)

FOREIGN PATENT DOCUMENTS

| | | |
|---|---|---|
| EP | 0 754 625 | 1/1997 |
| JP | 2002-193198 | 7/2002 |
| WO | 00/35753 | 6/2000 |

*Primary Examiner* — Timothy D Collins
*Assistant Examiner* — Keith L Dixon
(74) *Attorney, Agent, or Firm* — Carmody Torrance Sandak & Hennessey LLP

(57) ABSTRACT

The invention relates to the protection of spacecraft from debris and to de-orbiting devices of the atmospheric drag type, and to debris sweeping apparatus for the removal of debris from the space environment. The debris shielding apparatus for a spacecraft has a shield unit including a shielding surface for impeding incident debris. The shield unit is attached to the spacecraft body and has a drive mechanism for positioning the shield unit in relation to the spacecraft body. The drive mechanism is capable of moving the shield unit between a stowed first position and a deployed second position. In the deployed second position the plane of the shielding surface is at an angle to the spacecraft body.

19 Claims, 8 Drawing Sheets

(56) References Cited

U.S. PATENT DOCUMENTS

| | | | |
|---|---|---|---|
| 4,314,682 A | 2/1982 | Barnett et al. | |
| 4,936,528 A * | 6/1990 | Butner | B64G 1/56 244/171.7 |
| 4,991,799 A * | 2/1991 | Petro | B64G 1/10 244/14 |
| 5,080,306 A | 1/1992 | Porter et al. | |
| 5,120,008 A * | 6/1992 | Ramohalli | B64G 1/22 126/573 |
| 5,161,756 A | 11/1992 | Redmon, Jr. et al. | |
| 5,520,747 A | 5/1996 | Marks | |
| 5,527,001 A * | 6/1996 | Stuart | B64G 1/1007 136/245 |
| 6,196,501 B1 * | 3/2001 | Hall | B64G 1/222 244/171.7 |
| 6,227,497 B1 | 5/2001 | Draim | |
| 6,647,855 B1 | 11/2003 | Christiansen et al. | |
| 6,655,637 B1 * | 12/2003 | Robinson | B64G 1/007 244/172.4 |
| 7,309,049 B2 * | 12/2007 | Bigelow | B64G 1/56 244/158.3 |
| 7,464,900 B2 * | 12/2008 | Clark | B64G 1/56 114/361 |
| 2005/0063252 A1 | 3/2005 | Wulfken | |
| 2006/0081343 A1 | 4/2006 | Clark et al. | |
| 2009/0218448 A1 | 9/2009 | Peypoudat et al. | |

* cited by examiner

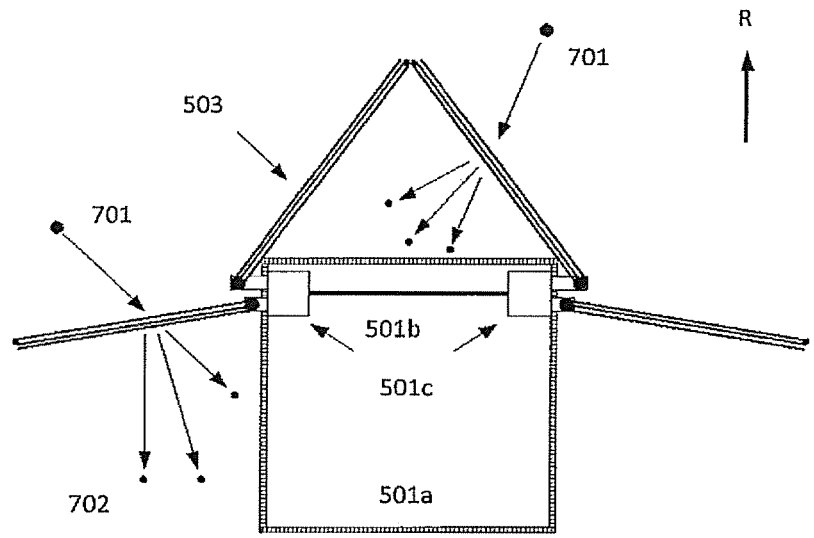
Figure 7
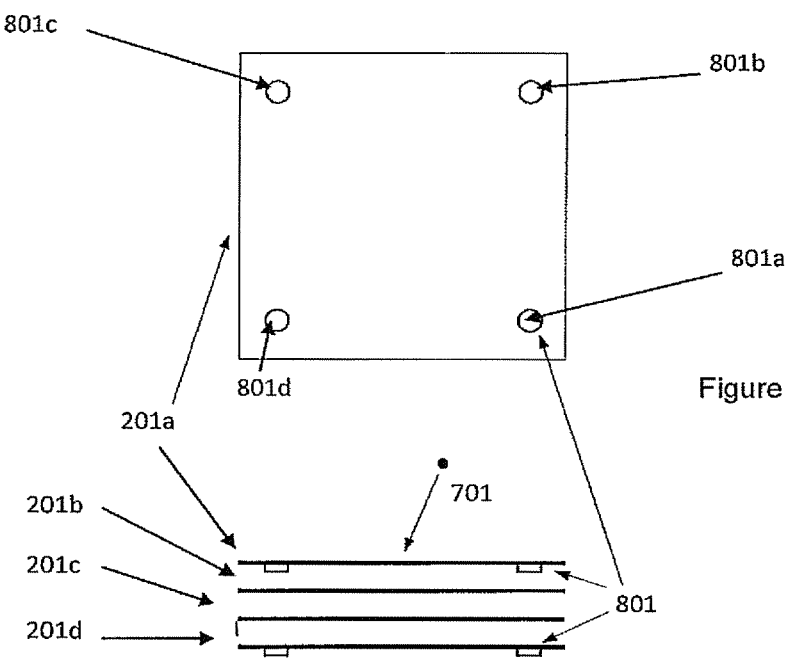
Figure 8a
Figure 8b

APPARATUS FOR SPACECRAFT

CROSS REFERENCE TO RELATED APPLICATIONS

This application is a continuation of U.S. application Ser. No. 13/514,175, currently pending, which itself is a National Stage application of International Application No. PCT/GB2010/052037, filed Dec. 7, 2010, the subject matter of which is incorporated by reference in its entirety.

BACKGROUND

Technical Field of the Invention

The invention relates to the protection of spacecraft from debris, in the preferred embodiment to the provision of shielding structures and for monitoring space debris impacts on the shielding structures. The invention also relates to the field of de-orbiting devices, in the preferred embodiment of the atmospheric drag type. The invention also relates to debris sweeping apparatus preferably for the removal of debris from the space environment.

Description of Related Art

A typical spacecraft in low Earth orbit (LEO) can have a through-life impact-induced probability of failure of up to 5% as a result of interaction with the population of orbital debris larger than 1 mm. Set in the context of the normal spacecraft reliability, this is significant and underlines the need for impact protection. In-flight impact damage data observed on spacecraft such as EURECA, LDEF, and the Hubble Space Telescope reinforces this need.

The Inter-Agency Space Debris Coordination Committee (IADC) has defined space debris as "all man-made objects including fragments and elements thereof, in Earth orbit or re-entering the atmosphere, that are non-functional". Broadly, there are three sources of debris: launch and mission related objects (LMRO), explosion and collision fragments, and non-fragmentation debris. Currently. LMROs account for much of the on-orbit mass of debris. Most of these objects are observed and tracked by the U.S. Space Surveillance Network (SSN) which maintains a catalog of objects and their associated orbits. The SSN routinely monitors objects larger than 10 cm in low Earth orbit and 1 m at geostationary orbit altitudes (GEO).

According to Dr H. Klinkrad, head of the European Space Agency's Space Debris Office, when classified by object categories, 31.8% of the catalog objects in 2005 were payloads (6% to 7% thereof active satellites), 17.6% were spent rocket upper stages and boost motors, 10.5% were mission-related objects, and the remainder of about 39.9% were debris, mainly from fragmentation events (28.4% caused by upper stages, and 11.5% caused by satellites). When classified according to orbit regimes, 69.2% of the catalog objects were in low-Earth orbits, at altitudes below 2,000 km, 9.3% were in the vicinity of the geostationary ring, 9.7% were on highly eccentric orbits (HEO), including the GEO transfer orbits (GTO), 3.9% were in medium Earth orbits (MEO), between LEO and GEO, and almost 7.8% were outside the GEO region. A small fraction of about 160 objects was injected into Earth escape orbits. Furthermore, in the non-trackable size range, it has been estimated that 10% of 1 mm size debris and 74% of 10 cm size debris are fragments resulting from spacecraft and rocket bodies that have exploded or collided. Another major source of sub-centimeter debris is non-fragmentation in nature. Products released from solid rocket motor firings are the main contributor in this category.

The first recorded collision between a spacecraft and a trackable debris object occurred in 1996 when the Cerise satellite was hit by a fragment from an Ariane rocket stage that had exploded ten years earlier. The collision severed a gravity gradient stabilisation boom causing the satellite to tumble rapidly. More recently, in 2009, the collision between the Iridium 33 satellite and an expired COSMOS 2251 satellite destroyed both satellites and created hundreds of fragments of debris which will remain in orbit for many years, thus adding to the growing population of debris in orbit around the Earth.

Fortunately, such dramatic events are rare as the population of trackable objects in Earth orbit (including debris) is still relatively small (i.e. around 15,000 catalog objects as of July 2009). However, the same is not true of smaller, non-trackable debris. It is estimated that there are tens of millions of millimeter-size pieces of debris orbiting the Earth, therefore the probability of such objects impacting a spacecraft is much higher.

Evidence confirms that spacecraft are routinely hit by small size debris and meteoroids. Examinations of the surfaces of manned spacecraft, such as the Space Shuttle and International Space Station (ISS), and unmanned spacecraft, such as EURECA, LDEF and the Hubble Space Telescope (HST), have revealed a wide variety of impact damage. Craters and holes have been observed on the outer surfaces of these spacecraft, and on their externally mounted equipment.

The consequences of an impact on a spacecraft are dependent on the characteristics of the impactor (such as mass and velocity), the location of the impact, and the design of the spacecraft. Therefore, a wide variety of damage effects can be expected, ranging from negligible to mission-terminating. Meteoroids can impact spacecraft at velocities in the range 1-72 km/s. For orbital debris, the impact velocities in Low Earth Orbit (LEO) can be as high as 16 km/s, however at GEO the relative velocities are less than 1 km/s. At these speeds, it is possible to relate impactor size to damage effect in an approximate fashion. For example, a 1 mm size debris particle can produce a crater or hole as large as 1 cm in diameter, and has sufficient energy to penetrate a typical spacecraft sandwich panel or external equipment. The damage from a 1 cm particle can penetrate deep inside an unmanned spacecraft causing extensive internal damage and potential loss of mission. Even the special purpose multi-layer shields on a manned spacecraft are only just capable of protecting against a 1 cm particle. A 10 cm debris impactor would most likely cause the destruction of a spacecraft.

The impact response of typical spacecraft panels, shields and equipment items, such as electronics boxes, wiring, batteries, solar cells, and propellant tanks are quantified experimentally by their ballistic performance. A significant parameter is the ballistic limit, which is the threshold at which failure occurs when a structure is impacted. For a given impact velocity, it is the minimum size of particle necessary to cause the structure to fail, where failure is usually defined as perforation.

Alternatively, for a given particle size, it is the velocity required for the particle to penetrate a structure.

Broadly, there are two different and distinct approaches that can be considered for reducing the impact vulnerability of spacecraft: 1) modify its architecture in terms of the layout of equipment, or 2) add shielding.

It is known that one approach to enhance protection on unmanned spacecraft is to add layers of shielding mass to honeycomb panels and multi-layer insulation (MLI). It has been demonstrated that this can increase the ballistic limit from about 0.7 mm to over 1 mm. While such improvements are useful, even with this type of enhancement, the probability of failure of a spacecraft can still be quite significant (several percent). At present, multi-layer shields are the most effective type of shielding to protect against particles up to one centimeter in size. One example is the stuffed Whipple shield. An impact shield of the type known in the art is shown in FIG. 1, where a sacrificial impactor disrupting layer 101 is provided above a primary spacing layer 102. This arrangement is held between a cover 104 and a base 105, and fixed to the spacecraft structure 103. The spacing between the disrupting layer and the spacecraft structure, in which the impact cloud may disperse, is represented by the spacing layer 102. Other known devices include that disclosed in WO 00/35753, which describes a multilayered hypervelocity impact shield. These shields are bulky and have a high weight overhead and in general are only used on manned spacecraft.

Spacecraft can be categorized as manned or unmanned. The risk of losing a manned mission warrants the provision of extensive shielding. Currently, there are very few spacecraft that carry astronauts. In Earth orbit, the vast majority of spacecraft are unmanned. They can be categorized according to their function; communication satellites are particularly common, and are generally used to relay radio signals from one point on the Earth's surface to another. Earth observation satellites are also common type of spacecraft and observe the Earth's land, oceans and atmosphere for a variety of reasons, including: scientific research, resource monitoring and management, meteorological (i.e. for weather prediction), geodesy, and reconnaissance and early warning (for military and intelligence purposes). The number of navigational satellites has grown significantly over the past two decades. These enable the determination of location anywhere on the Earth. Another way to classify spacecraft is according to their mass. This is useful because the size of a satellite is directly related to the cost of its launch. Satellite masses range from the very small (less than 0.1 kg) to the very large (more than 1,000 kg). A problem on unmanned spacecraft is to balance the risk of losing the mission to space debris versus the cost, in terms of weight, of providing a high level of shielding.

Since the mass of each subsystem on a spacecraft is carefully controlled any extra mass, for example shielding, must be justified.

Due to their operational interest and unique nature, the GEO and LEO regions are considered as protected regions with regard to space debris to ensure their safe and sustainable use in the future. The GEO protected region, as defined by the IADC is a segment of a spherical shell with the following characteristics:
a) lower altitude=geostationary altitude minus 200 km,
b) upper altitude=geostationary altitude plus 200 km, and
c) latitude sector: 15° South≤latitude≤15° North,
where geostationary altitude is approximately 35,786 km, i.e. the altitude of the geostationary orbit above a spherical Earth with an equatorial radius of 6,378 km. A geostationary orbit is a prograde, zero inclination, zero eccentricity orbit having a period of almost 24 hours. A spacecraft in such an orbit appears to be stationary when viewed from the Earth. The orbit is therefore ideal for certain types of communication satellite and meteorological satellite.

The LEO protected region, as defined by the IADC is a shell that extends from the surface of a spherical Earth with an equatorial radius of 6,378 km up to an altitude of 2,000 km. According to this definition any spacecraft orbiting within this region are said to be in a low earth orbit (LEO).

Medium Earth orbit (MEO) is the region that lies between the above-defined LEO and GEO regions.

A GEO transfer orbit (GTO) is a particular type of highly eccentric (i.e. highly elliptical) orbit (HEO) with an apogee of approximately 37,000 km and a perigee of several hundred kilometers. Spacecraft destined to operate in GEO are initially launched into a GTO.

Two altitudes within LEO are particularly popular for spacecraft operations. These are at approximately 800 km and 1,400 km above the Earth's surface. Unfortunately, these altitudes are also the most heavily populated with orbital debris. Predictions of the long-term growth of the debris population in these valuable regions indicate that routine spacecraft operations may soon no longer be possible because of the collision hazards.

It is against this backdrop that a range of space debris mitigation guidelines have been published. Of particular importance is the need for spacecraft designers and operators to dispose of spacecraft from the LEO region within 25 years of the end of mission, and ideally as quickly as possible.

Removal of spacecraft can be achieved by means including controlled propulsion manoeuvres or by deploying an orbital decay augmentation device. Increasing the surface area to weight ratio of the spacecraft at the end of its lifetime gradually decelerates the spacecraft primarily as a result of its interaction with the Earth's atmosphere (which extends up to several hundred kilometers in altitude). US2009/0218448 describes a satellite air braking wing structure.

De-orbiting devices should ideally bring the spacecraft down out of orbit as quickly as possible to minimize the risk of catastrophic collision with other large objects creating many hazardous debris fragments.

Therefore a large surface area is desirable. However, creating a large surface area presents a problem in terms of weight overhead, which must be kept to a minimum for cost reasons.

A further means of mitigating the risk of space debris is by removing debris from the space environment. It is known to provide spacecraft that are dedicated to the removal of debris, for instance by "sweeping" large panels along an orbital path to absorb or break up debris particles. U.S. Pat. No. 4,991,799 describes an orbital debris sweeper. A disadvantage of these systems is that it is very costly to provide a dedicated sweeping vehicle.

The implementation of measures to improve the survivability of spacecraft against debris impacts is a recommendation of the UNCOPUOS Scientific & Technical Subcommittee's Technical Report on Space Debris published in 1999. One of the most common ways to do this is through enhancements to the spacecraft structure, such as the addition of shielding.

SUMMARY OF THE INVENTION

The present invention seeks to provide improved spacecraft apparatus.

According to an aspect of the present invention, there is provided a debris shielding apparatus for a spacecraft, comprising a shield unit including a shielding surface for impeding incident debris, attachment means for attaching the shield unit to a spacecraft body, and a driving apparatus for positioning the shield unit in relation to the spacecraft body, wherein the driving apparatus is capable of moving the shield unit between a first stowed position and a second deployed position, wherein the plane of the shielding surface of the shield unit is at an angle to the spacecraft body in the second deployed position. An edge of the shield unit is preferably connected by a drivable joint, such as a hinge, to the attachment means so that the shield unit may be moved between the stowed and shielding positions. Alternatively the shield unit may be attached to the spacecraft using a mechanism, such as boom, which may have one or more driveable end-joints (not shown). An arrangement such as this creates a stand-off distance between the shield unit and the spacecraft, thereby allowing the shield unit to be connected via a panel face or an edge.

The shield apparatus can achieve an order of magnitude improvement in ballistic limit, but without the overhead associated with typical manned spacecraft shields. This is achieved in two ways. The first is through the provision of a shield unit which is stored against the spacecraft body during launch, and which may then be deployed, after the spacecraft has been released from the launcher, to a position at an angle to the spacecraft body to provide a large standoff distance. The second is by selecting the angle between the shield and the spacecraft to be dependent on the expected angle of incidence of the incoming debris flux. Debris may impact the shield from any direction, although for a particular orbit or trajectory the debris will impact from a preferential direction. For instance, debris impacts on the forward facing surfaces of a polar-orbiting, sun-synchronous LEO spacecraft at 800 km altitude are most likely to occur at azimuth angles of between approximately +45 to −45 degrees to the direction of travel. Thus, for optimum protection, the angle of the shield to the spacecraft body can be related to the angle of incidence of the peak or average debris flux.

The shield unit may be formed of a single shielding layer or a plurality of shielding layers, wherein the or each shielding layer is of a shielding material.

Multiple shielding layers are pivotally connected to each other and to driving means such that they may be unfolded by the driving means to a third position whereby the surface area of the shield unit is further increased to provide increased atmospheric drag. In this way the multilayer debris shield has dual and triple functionality, whereby when the spacecraft mission is complete, the debris shield can be unfolded to become a de-orbit device.

Advantageously, the multiple layers of the shield are pivotally connected so that they may be unfurled to increase the effective surface area of the spacecraft and create drag. The second advantageous effect of the large surface area is that the unfurled panels can be used to sweep debris from the space environment. By combining such multiple functionalities into a single apparatus, weight overhead is reduced and shielding protection may be increased.

The driving means may be the same as the driving apparatus for driving the shielding layers or separate driving means may be provided for each shielding layer.

The plurality of shielding layers may include a first shielding layer having an edge connected by a drivable joint such as a hinge to the attachment means, and further shielding layers may be pivotally connected to the first shielding layer either by hinges or by pivots that have a pivot axis perpendicular to the shielding plane. Alternatively, each of the further shielding layers may be pivotally connected in an arrangement, whereby a second shielding layer is connected to the first shielding layer, and a third shielding layer is connected to the second shielding layer, and so on, such that subsequent shielding layers are connected to the previous shielding layer.

The configuration and orientation of the shielding layers in the third position may be such that the spacecraft enters into a stable tumbling or spinning motion such that the surface area of the layers facing a given direction is maximised.

The configuration and orientation of the shielding layers in the third position may be such that the surface area of the layers facing the direction of motion is maximised in order to maximise atmospheric drag, or the configuration and orientation of the shielding layers in the third position may be such that the surface area of the layers facing the direction of maximum incoming debris flux is maximised. The configuration and orientation of the shielding layers in the third position may be such that the surface area of the layers facing both the direction of motion and the direction of incoming debris flux is optimised in order to maximise both atmospheric drag and interaction with the debris flux.

The material of the shielding layers may be selected from the list of Nextel®, Kevlar®, Beta Cloth, Spectra, CFRP, GFRP, aluminium sheet and aluminium mesh. Other suitable materials may be used. The driving apparatus for unfolding the shielding layers can be an electric motor or resilient element such as a spring with a controlled latch.

The debris shielding apparatus may be provided with at least one sensor to detect impacts from debris in space. A shielding layer may be provided with a plurality of impact sensors in order to identify the point of impact and energy of an incident debris particle, and a plurality of impact sensors may be provided on selected shielding layers such as an outer shielding layer and an inner shielding layer in order to determine speed and trajectory of an incident debris particle. Data from the impact sensors may be recorded and/or transmitted.

According to another aspect of the invention, there is provided a spacecraft including at least one debris shielding apparatus.

According to another aspect of the invention, there is provided de-orbiting apparatus for a spacecraft, comprising a plurality of panels each including a surface for creating atmospheric drag, attachment means for attaching the plurality of panels to a spacecraft body, and a driving apparatus for positioning the panels in relation to the spacecraft body, wherein the panels are pivotally connected to each other and to the driving apparatus such that the panels may be moved between a first stowed position where the panels are layered, and a second unfolded position where the panels are in a side by side relation and extended away from the body of the spacecraft.

The panels of the de-orbiting apparatus may be fabricated from a shielding material and therefore have a shielding effect on the spacecraft while in the first stowed position. The panels may be moved to an intermediate position where the panels are layered and are oriented at an angle to the spacecraft surface to which they are attached. The panels in the second unfolded position may sweep debris from the space environment.

Another aspect of the invention provides a debris sweeping apparatus for a spacecraft, comprising a plurality of panels each including a surface for collecting, or impeding the passage of, space debris, attachment means for attaching the plurality of panels to a spacecraft body, and a driving apparatus for positioning the panels in relation to the spacecraft body, wherein the panels are pivotally connected to each other and to the driving apparatus such that the panels may be moved between a first stowed position where the panels are layered, and a second unfolded position where the panels are side by side and extended away from the body of the spacecraft.

The panels may be fabricated from a shielding material and have a shielding effect on the spacecraft while in the first stowed position. The panels may be moved to an intermediate position where the panels are layered and are oriented at an angle to the spacecraft surface to which they are attached. The panels in the second unfolded position may produce atmospheric drag acting to de-orbit the spacecraft.

In another aspect of the present invention, there is provided a method of operating a shielding apparatus of the type taught herein, the method comprising moving a shield unit between a first stowed position, and a second shielding position which is canted at an angle to the spacecraft. In the first position the shield unit may be flush against the spacecraft or may be away from the spacecraft in order to accommodate features on the surface of the spacecraft; the first stowed position is where the space occupied by the shield unit and spacecraft is minimised. The method may further comprise moving a plurality of shielding layers of the shield unit from a layered arrangement to a side-by-side arrangement.

The invention may be used on unmanned spacecraft in Earth orbit, or manned spacecraft in Earth orbit or interplanetary spacecraft.

BRIEF DESCRIPTION OF THE DRAWINGS

Embodiments of the present invention are described below, by way of example only, with reference to the accompanying drawings, in which;

FIG. 7 is a cross sectional view of a cuboid-shaped spacecraft having a set of shield apparatuses illustrating the effect of debris particles incident on the shielding layers.

FIG. 8a is a plan view of a shield unit provided with impact sensors.

FIG. 8b is a cross sectional view of a shield unit provided with impact sensors.

DETAILED DESCRIPTION OF THE PREFERRED EMBODIMENT

The teachings herein provide a deployable multi-functional device that can provide spacecraft with a combination of the following functions: i) shielding against impacts from space debris and meteoroids, ii) in-situ detection of space debris and meteoroid impacts, iii) end-of-life deorbiting for spacecraft in LEO, iv) removal of small size debris from the space environment by acting as a 'sweeper'.

The shielding configuration provides an order of magnitude improvement in impact protection for a typical LEO spacecraft in a cost-effective manner. Impact detectors provide data for monitoring of the space debris environment, thus increasing knowledge for debris environment modellers, providing real-time information for spacecraft operators, and raising awareness of the problem of debris impacts. The ability to increase the surface area of the spacecraft assists end of life spacecraft deorbiting in LEO, thus providing benefits such as propellant-saving, increased mission revenue earning potential, and reduced post-mission time in orbit, thereby helping to achieve compliance with the 25-year deorbit rule as defined in international debris mitigation guidelines/standards. The increased surface area also enables the spacecraft to act as a debris sweeper during the de-orbit phase to provide a contribution towards removing debris from the space environment.

Figure 1:
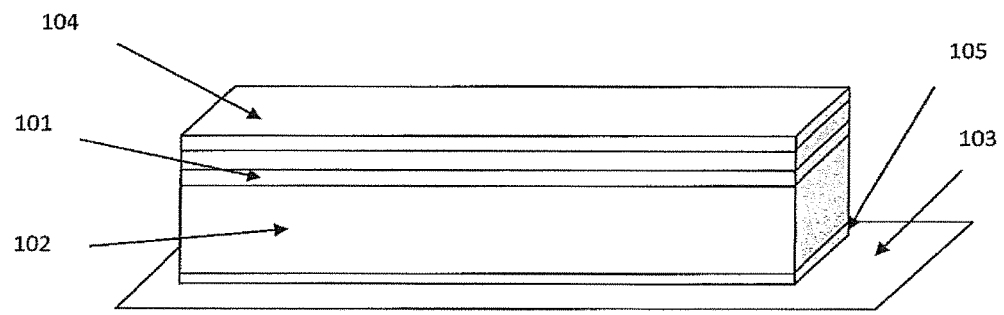
FIG. 1 is a cross sectional view of a shielding structure known in the art.
Figure 2:
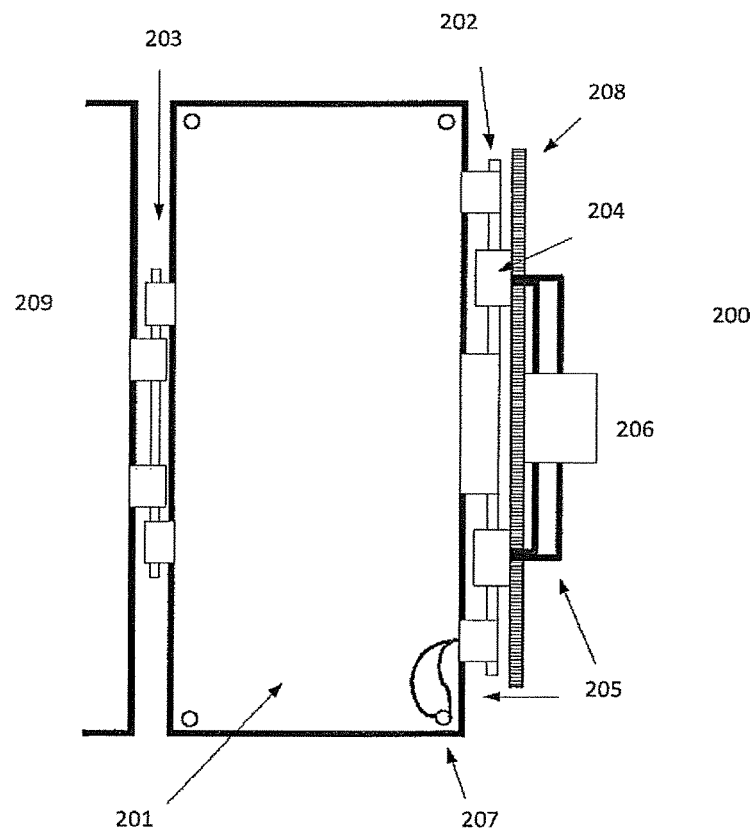
FIG. 2 is plan view of an embodiment of the invention showing a shielding panel and associated attachment and drive mechanisms.
Figure 4:
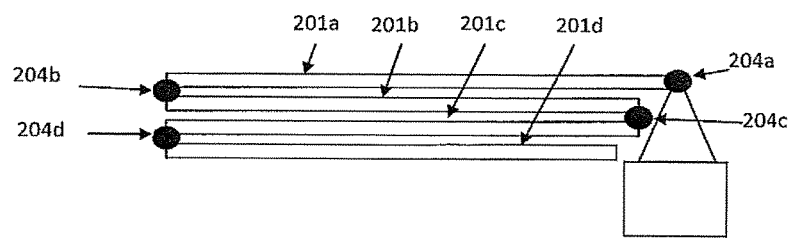
FIG. 4 is a cross sectional view of an embodiment of the invention showing the shielding layer components of a shield unit.

FIG. 2 is a view of a debris shielding apparatus 200 according to an embodiment of the invention. The shielding apparatus 200 comprises a shielding layer 201, a drive mechanism for the primary joint, which is a hinge in this example, and attachment means 204 for connecting the shielding layer 201 to the spacecraft structure 208. The shielding layer 201 is planar and rectangular in shape, having a substantially flat shielding face or surface of a length and width which are large in comparison to its thickness. The absolute dimensions of the shielding layer 201 will vary according to the size of the spacecraft to which it is attached, but typically will be sufficient to protect an exposed face of a spacecraft. The panels need not be rectangular or planar and other shapes and dimensions may be used depending on the shape and configuration of the spacecraft. The shielding layer 201 is provided with hinge elements 202, 203 along both of its edges. A primary hinge element 202 is provided with engagement means (not shown) for engaging with the primary hinge drive mechanism 204. The primary hinge drive mechanism 204 may be an electric motor or may be a spring and latch arrangement, or any other suitable drive means. The primary hinge drive mechanism 204 is arranged to be connected to a part of the spacecraft structure 208, which may either be a surface panel or part of the internal superstructure, such as a spar or chassis. The primary hinge drive mechanism 204 is connected to an electronic control system 206 which may be housed in a control electronics box-made of aluminium for the purpose of shielding against radiation and impacts. A secondary hinge element 203 is provided along the opposite edge of the shielding layer 201 to the primary hinge element 202 for connection to the hinge element of a further shielding layer 209. A secondary hinge drive mechanism may also be provided connected to the secondary hinge element 203 and connected to the electronic control system 206. Subsequent shielding layers may be connected in a similar way to the further shielding layer 209 as shown in FIG. 4. Impact sensors 207 are provided in the corners of the shielding layer 201 and connected by data and power cables 205 to the electronic control system 206.

Figure 3A:
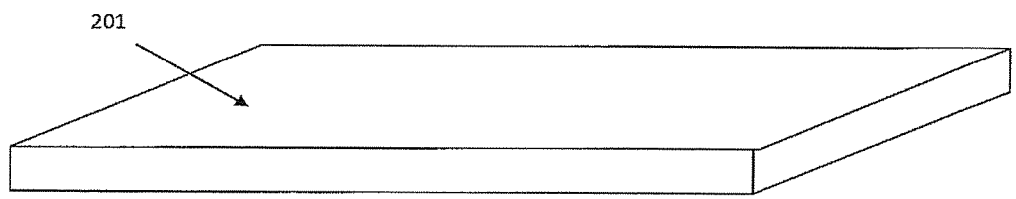
FIG. 3a is perspective view of a shielding layer in the form of a panel.
Figure 3B:
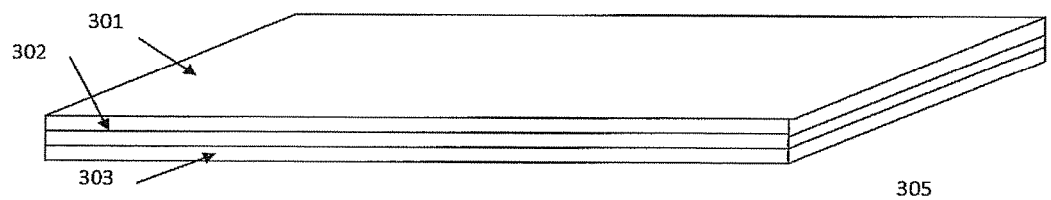
FIG. 3b is a perspective view of a composite shielding layer panel.
Figure 3C:
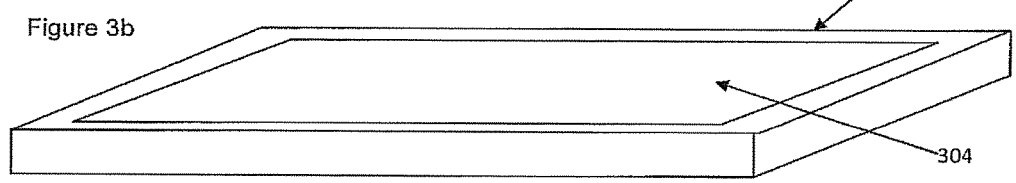
FIG. 3c is a perspective view of a shielding layer formed of a flexible material secured in a supporting frame.

FIGS. 3a to 3c show various forms of shielding layers in isolation. FIG. 3a shows a simple construction of shielding layer which comprises a single solid panel 201 of material such as aluminium. The panel is rigid and therefore self-supporting and fixtures can be attached directly to the panel. FIG. 3b shows a more complex structured shielding layer comprising multiple bonded layers 301, 302, 303 of solid and flexible shielding materials, selected in order to optimize the strength, weight and shielding ability. Again the shielding layer is rigid. FIG. 3c shows a shielding layer constructed from a flexible sheet 304 of shielding material and therefore a frame 305 is used to provide the required rigidity and locations for attaching the shielding layer to other structures. Suitable shielding materials that can be used to provide shielding layers include:

Aluminium sheeting, which was one of the first shielding materials to be used on spacecraft.

Nextel® which is a woven ceramic fabric manufactured by 3M Corporation. It is one of the most widely used shielding materials. Its fibers shock an incoming projectile into a cloud of smaller debris fragments. It is also effective at decreasing the impulsive loading of such a cloud. Nextel is manufactured in a variety of different styles and densities.

Kevlar® is also a popular spacecraft shielding material manufactured by DuPont Co. It is also widely used in bulletproof vests. A combination of Nextel and Kevlar can be used to mitigate against a complete range of incoming debris.

Beta cloth is widely used in multi-layer insulation which thermally protects spacecraft components. Beta cloth is also used because it offers protection against atomic oxygen degradation in space.

Aluminum mesh can be used as the front layer of a shield to help shock and break up an incoming projectile before it strikes the next layer in the shield.

Carbon fiber reinforced polymer (CFRP) and graphite fiber reinforced polymer (GFRP) can also be used and are manufactured as rigid sheets. Spectra is also a material that may be used to form shielding layers. Sandwich panels, such as those typically used in spacecraft structures, are another possibility.

FIG. 4 shows a debris shielding apparatus in accordance with an embodiment, where four shielding layers 201a, 201b, 201c and 201d are connected together in such a way that they form a multilayered structure, termed a shield unit 210. The upper shielding layer 201a is connected to the attachment and primary hinge drive mechanism 204 and also to a second shielding layer 201b by a hinge drive mechanism 204b, the second shielding layer 201b being substantially coincident with and beneath the first shielding layer 201a. The second shielding layer 201b is connected to a third shielding layer 201c by hinge drive mechanism 204c, and the third shielding layer 201c is positioned substantially coincident with and beneath the second shielding layer 201b. The third shielding layer 201c is connected to the fourth shielding layer 201d by hinge drive mechanism 204d and the fourth shielding layer 201c1 located substantially coincident with and below the third shielding layer 201c. In this way a multilayered shield unit 210 is provided, and during shielding operation the layers remain coincident with each other and are moved as a group between stowed and canted positions by means of the primary hinge drive mechanism 204. The shielding apparatus 200 is shown in isolation, i.e. not attached to a spacecraft. A spacecraft may use several such shielding arrangements to provide adequate protection for the entire spacecraft. In this instance the electronics for each shielding apparatus can be cross-coupled using harness interconnections to provide additional redundancy in case of failure. Control electronics interface with the communications subsystem to enable command of the device by a ground operator and for transfer of sensor data to the ground station. In FIG. 4 the length of the shielding layers 201a-d are not shown to scale.

Figure 5A:
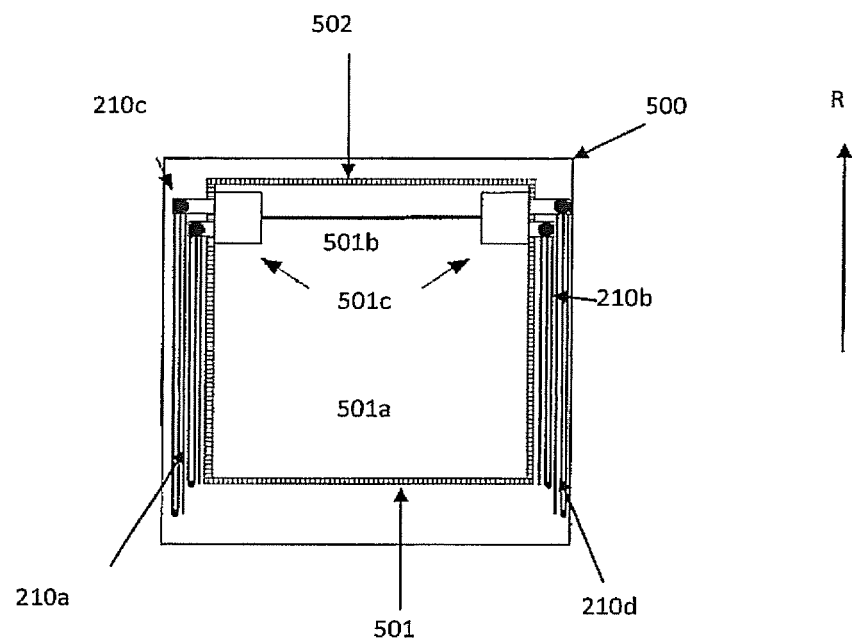
FIG. 5a is a cross sectional view of a cuboid-shaped spacecraft having a set of shielding apparatuses in a stowed position in accordance with an embodiment of the invention, in place in the payload bay of a carrier vehicle.
Figure 5B:
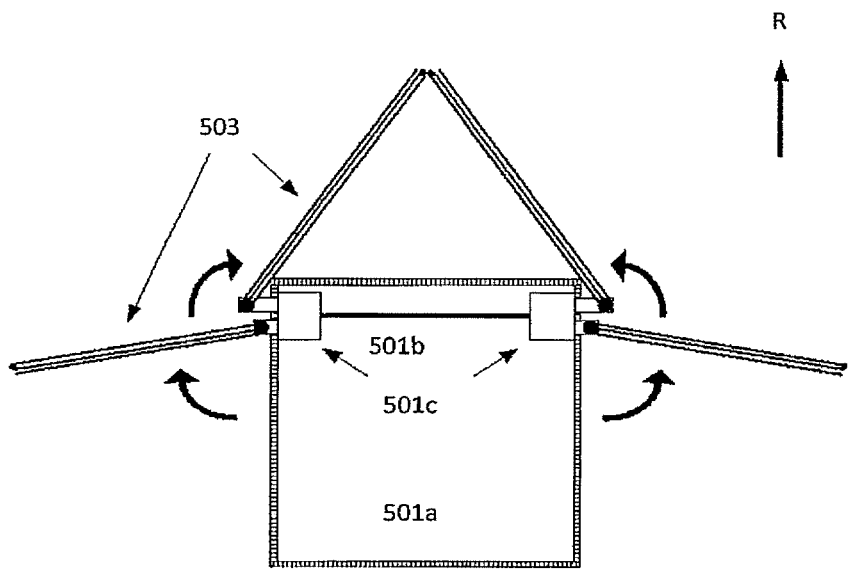
FIG. 5b is a cross sectional view of a cuboid-shaped spacecraft having a set of shield apparatuses in a deployed shielding position.
Figure 6A:
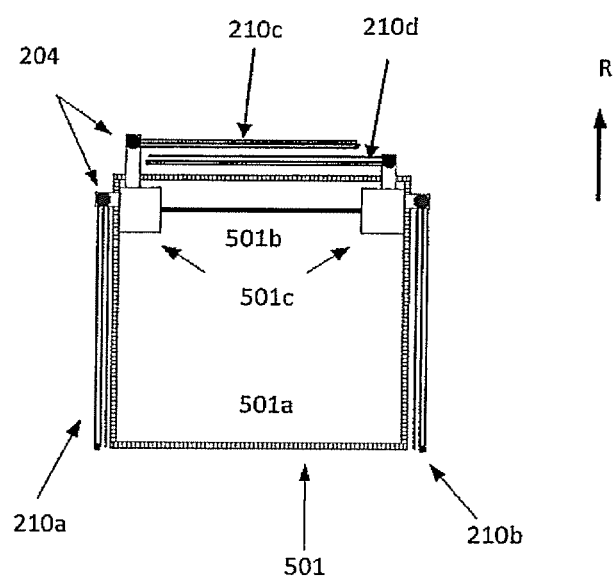
FIG. 6a is a cross sectional view of a cuboid-shaped spacecraft having a set of shield apparatuses arranged in a second configuration, shown in a stowed position.

FIG. 5a shows how a number of shielding arrangements 200 of the type shown in FIG. 4 may be fitted to a spacecraft 501. The spacecraft 501 illustrated is a satellite of simple cuboid shape. Within the interior 501a of the spacecraft 501 the harness 501b is shown with control electronics 501c. The shield system is scalable and therefore may be applied not just to the largest spacecraft but also small ones, e.g. of 20 cm width. The shape of the spacecraft to be protected is not limited to cuboid, and the system may be fitted to many different shapes and configuration of craft. The shield units 210a, 210b, 210c and 210d are shown in FIG. 5a in a stowed position. This is necessary to minimize volume when the spacecraft is placed inside the shroud or payload bay 500 of a suitable launch vehicle for its journey into space. In the example shown the shield units 210a-d are folded against the sides of the spacecraft 501 and the forward facing surface of the spacecraft is exposed. FIG. 5b shows the shield comprising one or more bumper layers in a deployed position 503. FIG. 6a shows another arrangement whereby shields 210a and 210b are provided on the sides of the spacecraft 501 and shields 210c, 210d are provided on the forward facing surface of the spacecraft 501. The forward facing surface of the spacecraft is sometimes called the RAM face, and the direction of travel of the spacecraft called the RAM direction, marked in the Figures as "R". Further shields not visible in the cross section may be provided on other faces of the spacecraft.

Figure 6B:
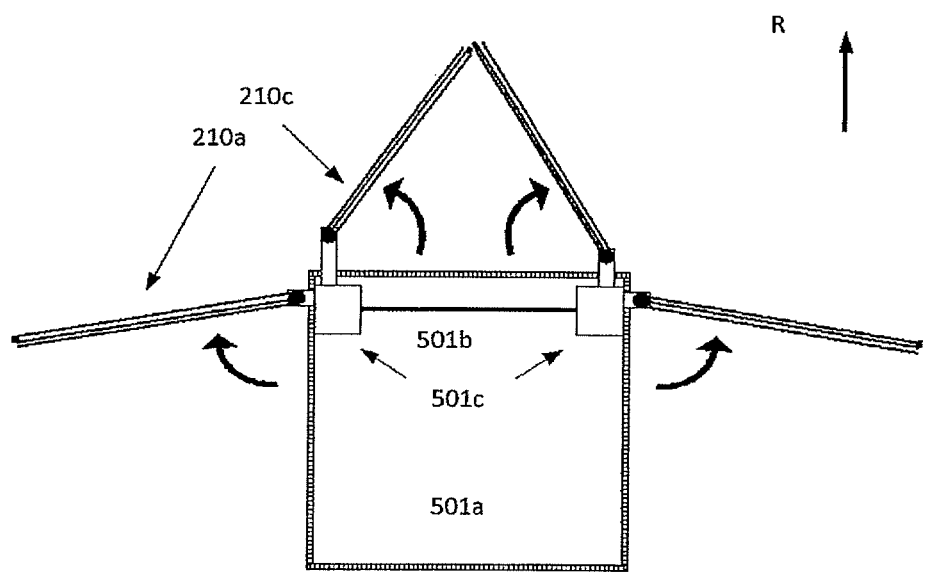
FIG. 6b is a cross sectional view of a cuboid-shaped spacecraft having a set of shield apparatuses arranged in a second configuration, shown in a deployed shielding position.

FIGS. 5b and 6b show the spacecraft 501 of FIGS. 5a and 6a where the shields 210a-d are in a deployed position providing protection to the RAM and side faces. This particular arrangement is well suited to protect polar-orbiting, sun-synchronous LEO spacecraft, which are more likely to experience nearly head-on debris impacts. However, for spacecraft in other orbits, different arrangements of deployed shields might be necessary to provide effective protection.

In operation a spacecraft is fitted with a shield system in accordance with an embodiment, as illustrated in FIG. 5a. The shield units 210a-d each comprising a series of shielding layers are folded in a stowed position during transit in the launch vehicle. A failsafe locking mechanism may be provided to ensure that the shield units 210a-d are not deployed until required. When the launch vehicle is at a suitable altitude the spacecraft 501 is ejected from the payload bay 500 and the spacecraft control systems take over operation. This may include self-propulsion of the spacecraft 501 to its operational orbit. When the spacecraft is clear of the launch vehicle, and prior to the start of the spacecraft mission, a signal is sent to the primary hinge drive mechanism to deploy the shield systems 210*a-d*. For side shields 210*a*, 210*b* this means canting the multilayered shields to an angle relative to the sides of the spacecraft 501. For the RAM face shields, the two shield units 210*c* and 210*d* rotate through an angle so that the ends meet and completely protect the RAM face.

In the embodiment shown in FIG. 6*b* the shield units 210*a-d* have a different arrangement on the spacecraft, but when they are rotated to stand away from the spacecraft body similar protection is given to the RAM and side faces as that achieved with the embodiment shown in FIG. 5*b*.

FIG. 7 shows a set of shielding apparatuses in the deployed canted position. It can be seen that in this position there is a large stand-off distance between the shielding layers 201*a-d* and the surface of the spacecraft 501. Since the shield is canted relative to the underlying spacecraft surfaces (e.g. honeycomb sandwich panels), this configuration provides more protection than shields with a restricted standoff. This is for two reasons; the first is that the ballistic limit is proportional to the stand-off distance between the shield and underlying spacecraft structure, therefore a greater stand-off distance improves the ballistic limit of the shield-structure configuration, i.e. protection from larger or faster debris particles. When a particle 701 perforates a wall and fragments, a debris cloud 702 is formed with a shock front which can cause damage to underlying surfaces. A greater stand-off distance allows the debris cloud to dissipate more before reaching the underlying spacecraft structure. The second reason that the canted shield is more effective than other shields is that the ballistic limit is proportional to the angle of incidence of the impacting debris particle in relation to the perpendicular direction to the shield. Therefore a grazing particle of a given size and velocity will be impeded more effectively than a particle impacting perpendicularly to the shield. Upon deployment of the shield, the canting angle is therefore set to enhance the angular dependence of the ballistic limit. The optimum angle will depend on the mission of the spacecraft and for orbiting spacecraft, the particular orbit around the Earth. This is because the direction of the impact flux that a spacecraft will experience is highly dependent on its orbit. For example, a spacecraft in a near-circular orbit at 800 km altitude whose orbital plane is inclined at 90 degrees to the equator, i.e. a polar orbit, will experience the highest debris impact fluxes at azimuth angles of between approx +45 and −45 degrees. Azimuth angle is the angle of impact of a debris object on a spacecraft as measured in the local horizontal plane of the spacecraft with respect to its direction of motion. That is, a 0 degree azimuth angle represents a head-on impact, a +90 degree azimuth is a right-side impact, a −90 degree azimuth is a left-side impact, and a 180 degree azimuth is an impact from behind. In the case of this particular polar orbit, the peak of the impact flux occurs at azimuths of approx +10 and −10 degrees and therefore near head-on impacts are more likely. However, for a spacecraft in a near-circular orbit at 800 km altitude whose orbital plane is inclined at 0 degrees to the equator, i.e. an equatorial orbit, the peak impact flux is at azimuth angles of approx. +60 degrees and −60 degrees. Therefore impacts on the right or left side of the spacecraft are more likely. Consequently, the optimum canting angles of the shields are dependent on the orbit of the spacecraft.

When the shields are deployed at a suitable angle the debris cloud material resulting from a particle penetrating the shield may be deflected away from the RAM face and side faces, or it may impact these surfaces at a more oblique angle thus reducing the possibility of penetration.

Impact sensors are provided to collect real-time impact data during a mission. In particular, data collected from impact sensors will not only benefit the spacecraft operator, it will also improve knowledge of the debris population in a discrete orbital region, and raise awareness of the problem of debris impacts. The shield assemblies 200 protect those surfaces of a spacecraft which experience the highest impact fluxes, and are therefore the ideal location for an impact sensor system. An arrangement of acoustic sensors or accelerometers are used as shown in FIGS. 8*a* and 8*b*. In this example, four sensors 801*a-d* are located on the underside of the outer shielding layer 201*a* and another four are located under the inner layer 201*d*.

As a minimum, this arrangement provides data on the point of impact of a debris particle and the impact energy. Additionally, if the particle penetrates the layers, it is also possible to derive speed and trajectory information. Clearly, there are many other possibilities for the choice and positioning of sensors. The sensors are connected by data and power cables to the electronic control system 206. Impact data may be stored or transmitted to the ground station.

It is recommended that a spacecraft in the LEO region should be removed from orbit at the end of its life so that it does not present a collision hazard with other large orbiting objects. The multiple shielding layers 201*a-d* which make up each shield unit 210*a-d* are arranged to deploy to a different position to maximize the cross-sectional area to weight ratio of the spacecraft, thereby increasing the atmospheric drag interaction with the Earth's upper atmosphere, and assisting the spacecraft with de-orbiting. Individual shielding layers 201*a-d* of each shield unit 210*a-d* are unfurled to transform the shield into a large area de-orbit device. The recent emergence of international guidelines and standards places a strong expectation/requirement that spacecraft in low Earth orbit be de-orbited within 25 years of the end-of-mission. Compliance with this 25-year rule is likely to be very challenging for manufacturers. Thus, the device should provide a useful contribution in this respect.

Figure 9A:
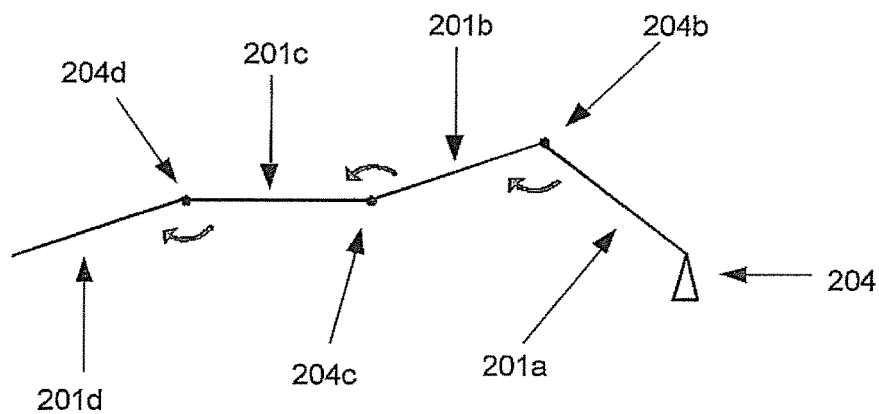
FIG. 9a is a side view of a shield unit unfurling into a linear array of panels for the purpose of de-orbiting and debris sweeping.

FIG. 9*a* shows how the shielding layers 201*a-d* shown in FIG. 4 are unfolded. A signal is sent from the electronic control system 206 to the hinge drive mechanisms 204*b*, *c* and *d*, which activate and rotate each shielding panel 201*b-d* with respect to its neighbour so that they are no longer coincident and layered, but aligned edge to edge.

In an embodiment each hinge is driven by a resilient means such as a spring, but only a single latch is used, so that when the latch is released all layers unfurl.

Figure 9B:
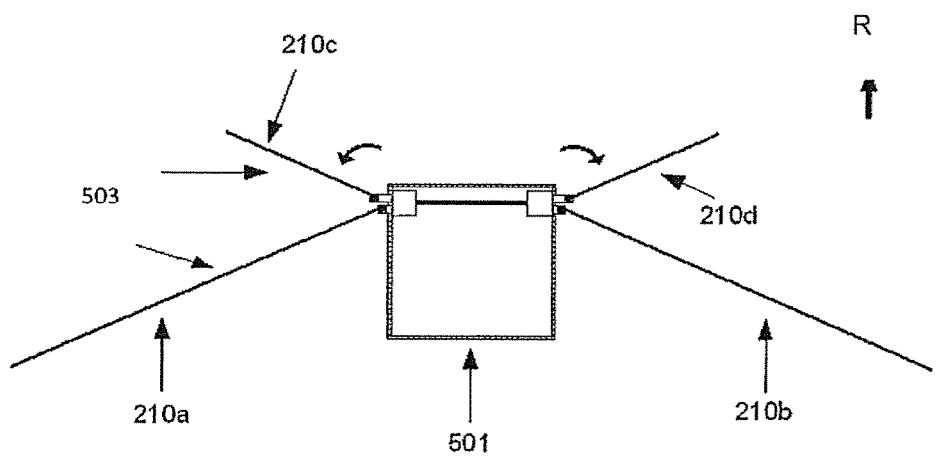
FIG. 9b is a cross sectional view of a spacecraft having a set of shield apparatuses, where the shield units are deployed into a position for the purpose of de-orbiting and debris sweeping.
Figure 10A:
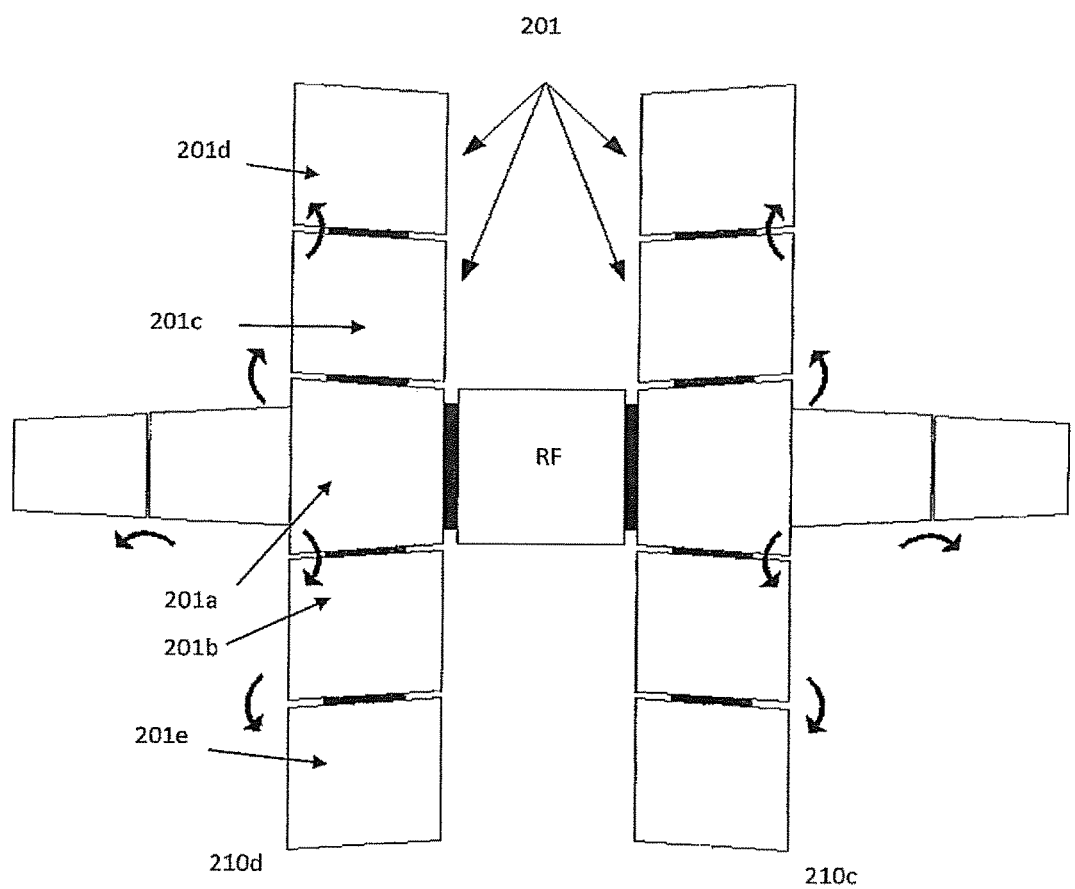
FIG. 10a is a plan view of a cuboid-shaped spacecraft having a set of shield apparatuses according to a further embodiment, where the shield units are deployed into a position for the purpose of de-orbiting and debris sweeping.

FIG. 9*b* and FIG. 10*a* shows two views of the spacecraft 501 where side face shield units 210*a*, band RAM face shield units 210*c*, *d* have been unfolded to their full extent. In this case, the shield layers unfurl into a linear array of panels. However, many other arrangements are also possible depending on the positioning of hinges and the number of layers. In particular, the method for unfurling each array, and its final configuration and orientation is determined by the location of other external items on the spacecraft, design issues such as damping of oscillations, and the need to maximise cross-sectional area for the purposes of atmospheric drag induced de-orbiting. In this latter regard, the configuration and orientation of the deployed large area arrays may be designed to ensure the post-mission uncontrolled spacecraft goes into a stable tumbling or spinning motion.

In FIG. 10a, the RAM face shield units 210c, 210d are attached to the spacecraft along an edge of a first shielding panel 201a. Two further shielding panels 201b, 201c are connected to the first shielding panel 201a along its edges that are perpendicular to the spacecraft attachment edge. Still further shielding panels 201d, 201e extend from panels 201b, 201c in the same direction. In this way the front cross-sectional area of the spacecraft is maximized.

Figure 10B:
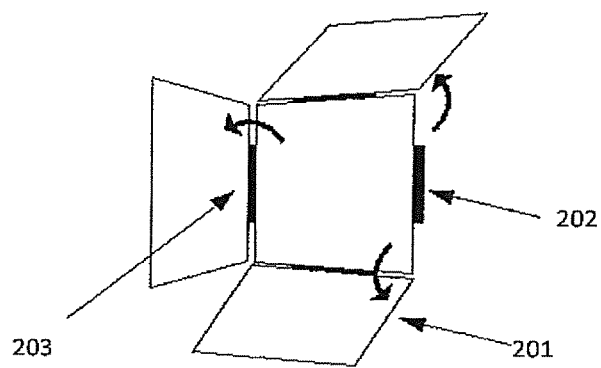
FIG. 10b is a perspective view of an embodiment where the shielding layers of a shield unit are arranged to open in a flower-type arrangement.

In FIG. 10b, the transformation of the multi-layer shield into a large area de-orbit device is by shielding layers unfolding on the same principle as a flower that opens its petals.

Figure 10C:
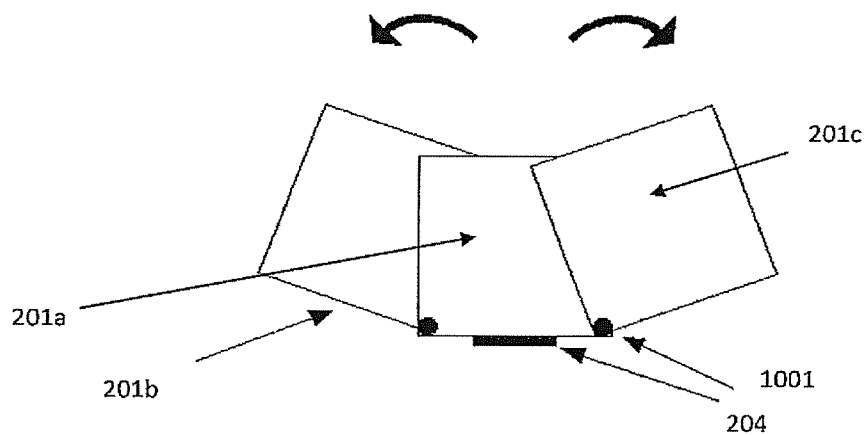
FIG. 10c is a perspective view of an embodiment where the shielding layers of a shield unit are arranged to open in a fan-type arrangement.

In FIG. 10c the primary shielding layer 201a is connected to the primary hinge drive mechanism 204, which in turn is connected to the spacecraft (not shown). Two further shielding layers 201b and 201c are connected to the primary shielding layer 201a. The shielding layers 201b and 201c are each connected by a hinge 1001 located at a corner to the shielding layer 201a, allowing rotation about an axis which is perpendicular to the debris impacting face of the shielding layers. When the shield unit is unfolded, the movement of the shielding layers is rotational in the plane of the debris impacting faces in a fan-type arrangement.

Alternatively the shield unit may be attached to the spacecraft using a mechanism, such as a boom, which may have one or more driveable end-joints. An arrangement such as this creates a stand-off distance between the shield unit and the spacecraft, thereby allowing the shield unit to be connected via a panel face or an edge.

This arrangement may also be necessary if it is not possible to stow the shield units flush against the spacecraft.

During the de-orbit phase, because of its large area and the use of shielding materials, the device also acts as a debris 'sweeper'. Depending on the design of the shield layers, small particles (e.g. of the order of 0.1 mm in diameter or less) that impact the deployed panels will be removed from the environment, whereas larger sub-centimeter particles that impact the panels will penetrate and fragment into clouds of smaller particles. These can be considered less hazardous because of their smaller size and reduced orbital lifetime. Thus, the device provides a contribution towards cleaning the space environment.

During operation of the apparatus as a de-orbit and/or sweeping device the sensors 801a-d may remain operational, providing useful data on the distribution of debris encountered by the spacecraft.

It will be appreciated that the shield units 210 can be formed of many shielding layers, or alternatively of a single layer. In the case of the multi-layer shielding configuration, different materials can be used for each of the layers. The number of shielding layers, their size, spacing, materials, and thickness is determined not only by the need for protection, but also the design requirements of the large area device into which it transforms at end-of-life, and the overall design constraints of the spacecraft itself. An aspect of this determination will be to ensure that the passage of a particle through the shield does not cause the shielding layers to fuse together preventing them from being unfurled at end of life.

The debris shielding apparatus 200 may be used as only a de-orbiting device. In this instance a multiple layered structure of the type illustrated in FIGS. 4 and 5a is provided in a stowed position during the mission lifetime. When the spacecraft 501 is required to de-orbit the electronic control system sends a signal to all of the hinge drive mechanisms to unfold the de-orbit panels directly from the stowed position to the maximum surface area de-orbit position. In this instance the panel material is selected for its ability to increase drag, rather than its ability to survive impacts from space debris, and may therefore be a thin sheet of material such as foil. The arrangement of panels in their unfolded state may be selected to ensure a stable tumbling motion of the spacecraft and therefore the atmospheric drag properties of the structure are optimized.

The debris shielding apparatus 200 may be used only as a debris sweeping device. In this instance a multiple layered structure as shown in FIG. 4 is used, and stowed in the launch vehicle, as shown in FIG. 5a. When the apparatus is deployed the layers are unfolded to an arrangement as shown in FIG. 10a where the surface area is maximized. It may be necessary to provide additional propulsion to the spacecraft to overcome the effects of atmospheric drag. In this instance the layer material is selected for its ability to absorb and fragment debris.

The debris shielding apparatus 200 may be used as a shield and a de-orbiting device, or as a shield and sweeping device or as a de-orbiting device and sweeping device.

The integration of one or more of the devices on a typical LEO spacecraft will be driven by a number of considerations other than the need to maximise impact protection or cross-sectional area for de-orbiting/debris sweeping purposes. One important factor is the configuration of the spacecraft which will constrain options for possible locations. The positions of externally mounted equipment on the spacecraft may also limit the possibilities for where a device is located, and how it is stowed and deployed. Conversely, to accommodate a device it might be necessary to modify the design or location of other equipment items. The device might also affect the design of various spacecraft subsystems in terms of the resources it requires, e.g. data and power links. In view of factors such as these, it should be clear that the integration of one or more of the devices on a spacecraft should be considered during the earliest stages of the spacecraft design process.

All combinations of applications may be used with or without the sensor capability described in relation to FIG. 8.

The invention claimed is:

1. Apparatus for a spacecraft, comprising:
a planar space debris and meteoroid shield unit including at least one space debris and meteoroid shielding layer having a space debris and meteroid shielding surface;
attachment means for attaching the space debris and meteoroid shield unit to a spacecraft body; and
a driving apparatus configured to move the space debris and meteoroid shield unit between a stowed first position, a fully deployed second position and a fully deployed third position, the driving apparatus being further configured to hold the space debris and meteoroid shield unit in the fully deployed second position and in the fully deployed third position wherein the plane of the space debris and meteoroid shielding surface in the fully deployed positions is at an angle to the plane of the space debris and meteoroid shielding surface in the stowed first position whereby in the fully deployed second position the space debris and meteoroid shield unit impedes incident space debris and meteoroids and in the fully deployed third position the space debris and meteoroid shield unit provides increased atmospheric drag and/or debris sweeping.

2. Apparatus in accordance with claim 1, wherein the angle of the plane of the space debris and meteoroid shielding surface in its fully deployed second position is selected in dependence on the expected angle of incidence of the peak or average flux of incoming space debris and meteoroids.

3. Apparatus in accordance with claim 1, wherein the space debris and meteoroid shield unit is connected to the attachment means by a drivable joint such as a hinge.

4. Apparatus in accordance with claim 1, wherein the space debris and meteoroid shield unit is connected by a stand-off mechanism, such as a boom, to the attachment means.

5. Apparatus in accordance with claim 1, wherein the space debris and meteoroid shield unit is formed of a plurality of space debris and meteoroid shielding layers of shielding material and in the stowed first position the plurality of space debris and meteoroid shielding layers overlap one another.

6. Apparatus in accordance with claim 1, wherein the space debris and meteoroid shield unit is formed of a plurality of space debris and meteoroid shielding layers of shielding material and the space debris and meteoroid shielding layers are pivotally connected to each other and to a shield layers driving device whereby in the fully deployed second position the space debris and meteoroid shielding layers overlap one another in a folded configuration and in the fully deployed third position the space debris and meteoroid shielding layers are unfolded by the driving device into a side by side arrangement so that the surface area of the space debris and meteoroid shield unit is increased.

7. Apparatus in accordance with claim 6, wherein the shield layers driving device is the same as the driving apparatus for driving the space debris and meteoroid shield unit.

8. Apparatus in accordance with claim 6, wherein a separate shield layer driving device is provided for each space debris and meteoroid shielding layer.

9. Apparatus in accordance with claim 6, wherein the material of each of the space debris and meteoroid shielding layers is selected from the list of woven ceramic fabric, CFRP, GFRP, and aluminum.

10. Apparatus in accordance with claim 6, wherein a space debris and meteoroid shielding layer is provided with at least one impact sensor.

11. Apparatus in accordance with claim 6, wherein the space debris and meteoroid shielding layer is provided with a plurality of impact sensors in order to identify the point of impact and energy of an incident debris particle.

12. Apparatus in accordance with claim 6, wherein a plurality of impact sensors are provided on selected space debris and meteoroid shielding layers.

13. A spacecraft having at least one apparatus of the type claimed in claim 6.

14. Apparatus in accordance with claim 6, wherein the angle of the plane of the space debris and meteoroid shielding layer or layers in the fully deployed second position is different to the angle of the plane of the space debris and meteoroid shielding layer or layers in the fully deployed third position.

15. A spacecraft according to claim 13, comprising a plurality of space debris and meteoroid shield units, wherein at least two of the space debris and meteoroid shield units together form a continuous bumper shield in their fully deployed second positions.

16. Apparatus in accordance with claim 1, wherein a space debris and meteoroid shielding layer is provided with at least one impact sensor.

17. Apparatus in accordance with claim 1, wherein the space debris and meteoroid shielding layer is provided with a plurality of impact sensors in order to identify the point of impact and energy of an incident debris particle.

18. A spacecraft having at least one apparatus of the type claimed in claim 1.

19. Apparatus in accordance with claim 1, wherein the angle of the plane of the space debris and meteoroid shielding layer or layers in the fully deployed second position is different to the angle of the plane of the space debris and meteoroid shielding layer or layers in the fully deployed third position.

* * * * *